United States Patent [19]
Walker

[11] 3,808,544
[45] Apr. 30, 1974

[54] SEQUENTIAL MACHINES
[75] Inventor: Brian Stanley Walker, Surrey, England
[73] Assignee: National Research Development Corporation, London, England
[22] Filed: Mar. 28, 1972
[21] Appl. No.: 238,848

[52] U.S. Cl................... 328/75, 307/223, 307/232, 328/92, 328/206
[51] Int. Cl....................... H03k 17/26, H03k 17/00
[58] Field of Search............. 328/92, 109, 119, 120, 328/206, 69, 75; 307/232, 223

[56] References Cited
UNITED STATES PATENTS
2,866,092  12/1958  Raynsford....................... 328/109 X
3,206,683  9/1965  Davis et al............................ 328/97
3,399,351  8/1968  Reszka............................ 328/120 X Primary Examiner—John Zazworsky
Attorney, Agent, or Firm—Kemon, Palmer and Estabrook

[57] ABSTRACT

A logic element which can perform the functions of a node in a state graph comprising a bistable arranged in its set state to open a number of gates to connect stimulus inputs to respective outputs and to provide a resetting signal for other nodes of the state graph. Preferably the resetting signal is applied to the input terminal to which the signal operative to set the bistable was applied.

11 Claims, 4 Drawing Figures

SEQUENTIAL MACHINES

This invention relates to sequential machines and logic elements to form nodes therefor.

The design of a sequential machine, be it a complete computer or a simple circuit such as a one shot switch, starts as a mental concept and it is then translated to a word statement. The problem may then be attacked by intuitive or formal techniques or by a mixture of both. In either case a state graph may be used to illustrate the operation of the machine. The term 'state graph' is used herein to mean a diagram in which each state of the machine is represented by a node, and the response to the machine to each of the external stimuli which may be applied to it in each of its possible states is represented by respective arrows connecting the node representing the state of the machine before such stimulus is applied to the node representing the state of the machine after application of the stimulus. The arrows indicate the direction of transfer of information. If a stimulus causes the machine to remain in its prior state, this is represented on the state graph by a link in the form of a sling, both ends of which are in contact with the node in question.

When formal techniques of design are used, the next step is to produce a flow table in which the output state of the machine is tabulated against known stimuli which cause transitions between states. The flow table puts the problem into matrix form so that it can be operated on by various matrix and set mathematical techniques. With any problem but the simplest, this approach becomes very highly complicated and, due to its binary nature, it is not efficient and moreover it is often impractical to perform the process automatically using computers of the type presently available.

It is an object of the present invention to provide a logic element which can perform the functions of a node in a state graph when having connections to other such logical elements corresponding to the links of the state graph.

According to the invention, a logic element comprises a control device having first and second stable states and adapted to be set into its first stable state in response to an input signal at the first input thereof, gating means operative in response to the control device to connect a plurality of stimulus input terminals of the element in respective output terminals thereof when the control device is in its first stable state and resetting means for producing a resetting signal consequent upon said control device taking up its first stable state.

It will be realised that, as each control device takes up its first state to indicate that the machine is in the state represented by the corresponding node of the state graph, it is necessary to reset the previous node. In one embodiment of the invention, each link of the state graph is implemented by two connections between logical elements, one for transmitting the forward going signal to set a subsequent node while the other carries a resetting signal to reset the previous node.

According to a preferred form of the invention, the resetting means is operative to apply a resetting signal to said first input of the control device, the element also comprising reset response means for applying a signal to a second input of the control device to set it into its second stable state responsive to receipt of a resetting signal at an output terminal thereof. With this embodiment, each link of the state graph is implemented by only a single connection between logical elements.

Some embodiments of the invention will now be described, by way of example, with reference to the accompanying drawings, in which.

Figure 1:
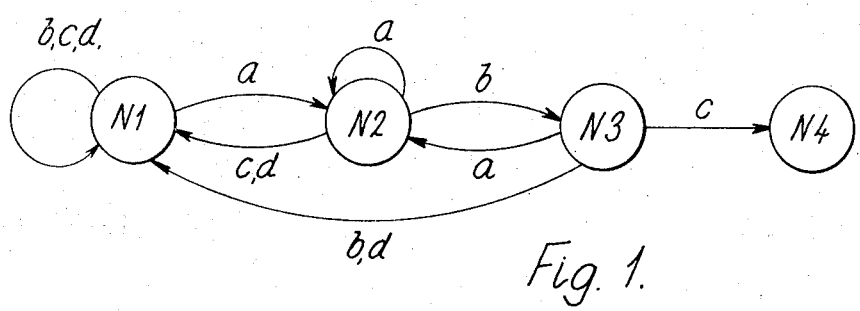
FIG. 1 is a state graph.

FIG. 1 is a state graph illustrating the logical steps involved in detecting the sequence of signals $a, b, c$ from amongst the four signals $a, b, c, d$. The state graph shows four nodes N1, N2, N3 and N4, each of which represents a state. Thus, if the node N1 is set and receives a signal $b, c$ or $d$ it stays in this state as indicated by the sling attached to the node N1 of FIG. 1. On the other hand, if the signal $a$ is received, the node N2 is set as indicated by the corresponding arrow and the node N1 reset. If now a further signal $a$ is received, then, as indicated by the loop attached to the node N2, no change takes place. If either of signals $c$ and $d$ is received, the diagram returns to its initial state with node N1 set. On the other hand, if signal $b$ is received, node N3 is set.

If, with node 3 set, signal $a$ is received, the diagram returns to the state with node N2 set. If either of signals $b$ and $d$ is received, the diagram returns to its initial state with node N1 set. If on the other hand signal $c$ is received, node N4 is set indicating that the required sequence $a, b, c$ has been detected. In order to provide a machine for carrying out the operation represented by the sequence diagram shown in FIG. 1, in accordance with a main feature of the invention, there are provided logic circuits which perform the functions of the nodes N1, N2 and N3. Such logic circuits are herein referred to as nodal elements.

Figure 2:
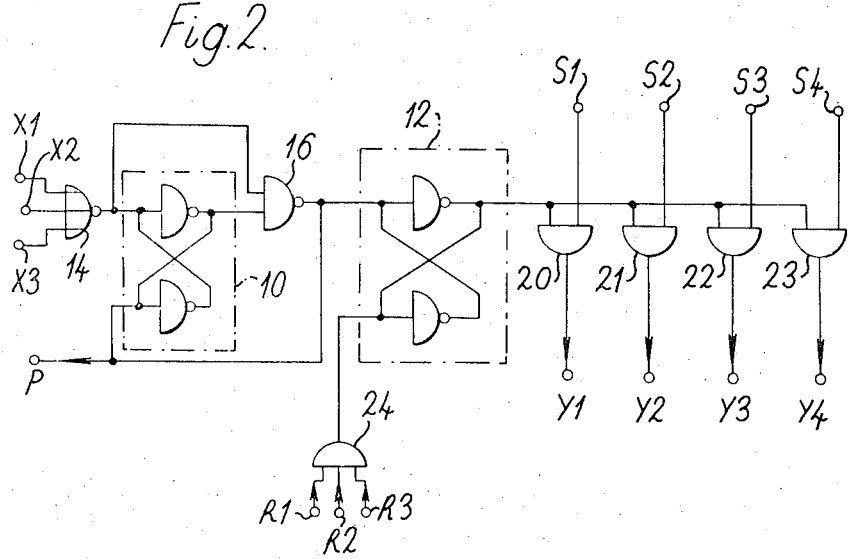
FIG. 2 is a block schematic diagram of a nodal element in accordance with an embodiment of the invention.

FIG. 2 illustrates a nodal element the basic components of which are a pair of bistable devices 10 and 12 each of which comprises a pair of cross-connected NAND gates. The nodal element may be set by an input signal on any one of the terminals X1, X2 and X3 which are connected via a NOR gate 14 to the set input of the bistable 10. The set output of the bistable 10 is connected via a NAND gate 16 both to the set input of the bistable 12 and to an output terminal P, which is used to provide a resetting signal for the previous node in the sequence. The output of the NOR gate 14 is also connected to the other input of the NAND gate 16 so that an output signal from the bistable 10 is available only when the input signal on one of the terminals X1, X2, X3 has ceased.

The set output of the bistable 12 is connected to one input of each of a plurality of AND gates of which four 20 to 23 are shown. Each of the AND gates 20 to 23 has its other input connected to a respective stimulus input terminal S1, S2, S3 and S4 and its output to a respective output terminal Y1, Y2, Y3 and Y4. A further AND gate 24 having inputs connected to terminals R1, R2 and R3 is connected to the reset input of the bistable 12 and provides means for resetting the nodal element.

Thus, when an input signal is applied to one of the terminals X1, X2 and X3 of the nodal element shown in FIG. 2, the bistable 10 is set. As soon as the input signal ceases, the NAND gate 16 opens so that the bistable device 12 is set, the bistable device 10 is reset and a signal is available at the terminal P. Setting of the bistable 12 opens the AND gates 20 to 23 so that a stimulus signal at any of the terminals S1, S2, S3 or S4 is passed to the corresponding output terminal Y1, Y2, Y3 or Y4.

Figure 3:
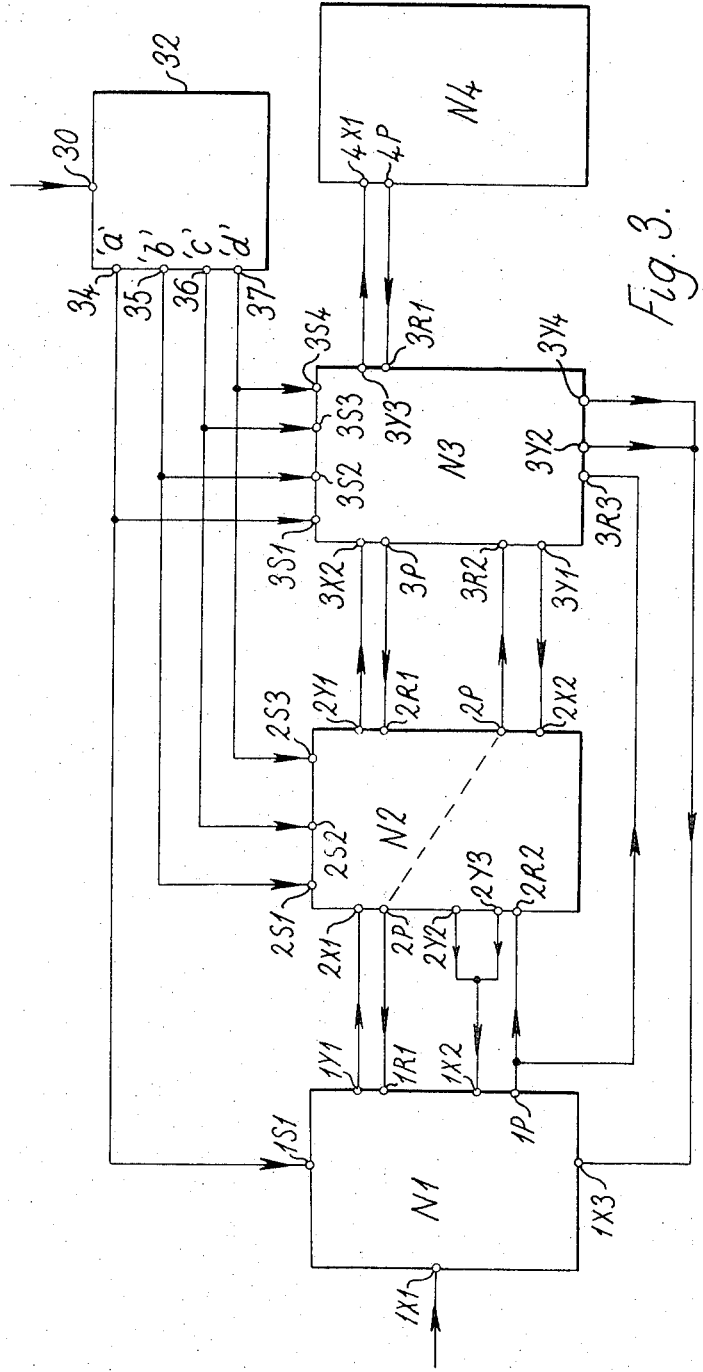
FIG. 3 is a block schematic diagram of a sequential machine for implementing the state graph of FIG. 1 and incorporating nodal elements of the type illustrated in FIG. 2.

FIG. 3 shows how a sequential machine to perform the functions illustrated by the state graph of FIG. 1 may be constructed using nodal elements as illustrated in FIG. 2. The references of the terminals in FIG. 3 consist of an initial digit indicating the number of the node concerned followed by letter and digits identical with the reference used in FIG. 2. The various connections will be explained in the following description of the manner of operation of the machine.

Incoming signals on terminal 30 are supplied to a unit 32 which consists of a set of recognition gates and has four output terminals 34, 35, 36 and 37. The recognition gates are so arranged that an output is produced on terminal 34 when signal $a$ is received at terminal 30, an output on terminal 35 when signal $b$ is received, an output on terminal 36 when signal $c$ is received and an output on terminal 37 when signal $d$ is received.

Initially the node N1 is set by a signal on terminal 1X1. If the sequential machine shown in FIG. 3 is an isolated unit, arrangements are preferably made for this signal to be generated when the machine is first switched on. If the machine is part of a larger system, the system must be arranged to supply such a signal when it is desired to recognise the sequence $a, b, c$. The only stimulus input to the node N1 is to terminal 1S1 from line 34 which is energised when signal $a$ is received. No input is provided when signals $b, c$ or $d$ are received since these signals are shown as producing a loop in the state diagram of FIG. 1 so that the node N1 is required to be left in its set state. Since the node N1 is set, the signal on terminal 1S1 resulting from the occurrence of signal $a$ is passed to output terminal 1Y1 which is connected to terminal 2X1 causing the node N2 to be set. The node N2 thereupon produces a signal on its output terminal 2P which is connected to the terminal 1R1, resetting the node N1. It should be noted that the terminal 2P is shown twice, connected by a dotted line, for convenience of representation and would, in practice, normally take the form of a single terminal.

Since the state graph of FIG. 1 shows the signal $a$ causing a loop when the node N2 is set, line 34 is not connected to the node N2. Lines 35, 36 and 37 are connected to terminals 2S1, 2S2 and 2S3 respectively. If either signal $c$ or signal $d$ is received while node N2 is set, the resulting input signals at terminals 2S2 or 2S3 are applied to terminals 2Y2 or 2Y3 which are connected to terminal 1X2. The signal at terminal 1X2 sets the node N1 which then produces an output signal at its terminal 1P which is connected to terminal 2R2 so that the node N2 is reset. On the other hand, if signal $b$ occurs when node N2 is set, the resulting signal at terminal 2S1 is applied to output terminal 2Y1 which is connected to terminal 3X2 so that the node N3 is set.

The resulting signal at terminal 3P, which is connected to terminal 2R1, resets the node N2.

Since, in FIG. 1, no loop is associated with the node N3, all four terminals 34 to 37 are connected to terminals 3S1, 3S2, 3S3 and 3S4 respectively of the nodal element N3.

If when node N3 is set, signal $a$ is received, the resulting input signal on terminal 3S1 is passed to output terminal 3Y1 which is connected to the terminal 2X2 so that the node N2 is set. Setting of the node N2 produces an output signal on terminal 2P which is connected to terminal 3R2 so that the node N3 is reset. If when the node N3 is set, signals $b$ or $d$ are received, the resulting input signals at terminals 3S2 or 3S4 are passed to output terminals 3Y2 or 3Y4 which are connected to terminal 1X3 so that the node N2 is set. Terminal 1P is connected to terminal 3R3 so that setting of node N1 resets node N3.

If, on the other hand, when the node N3 is set, signal $c$ is received, the resulting input signal at terminal 3S3 is passed to terminal 3Y3 which is connected to terminal 4X1 so that the node N4 is set. This causes a signal to be produced at terminal 4P which is connected to terminal 3R1 so that the node N3 is reset. The setting of the node N4 indicates that the sequence $a, b, c$ has been received.

Figure 4:
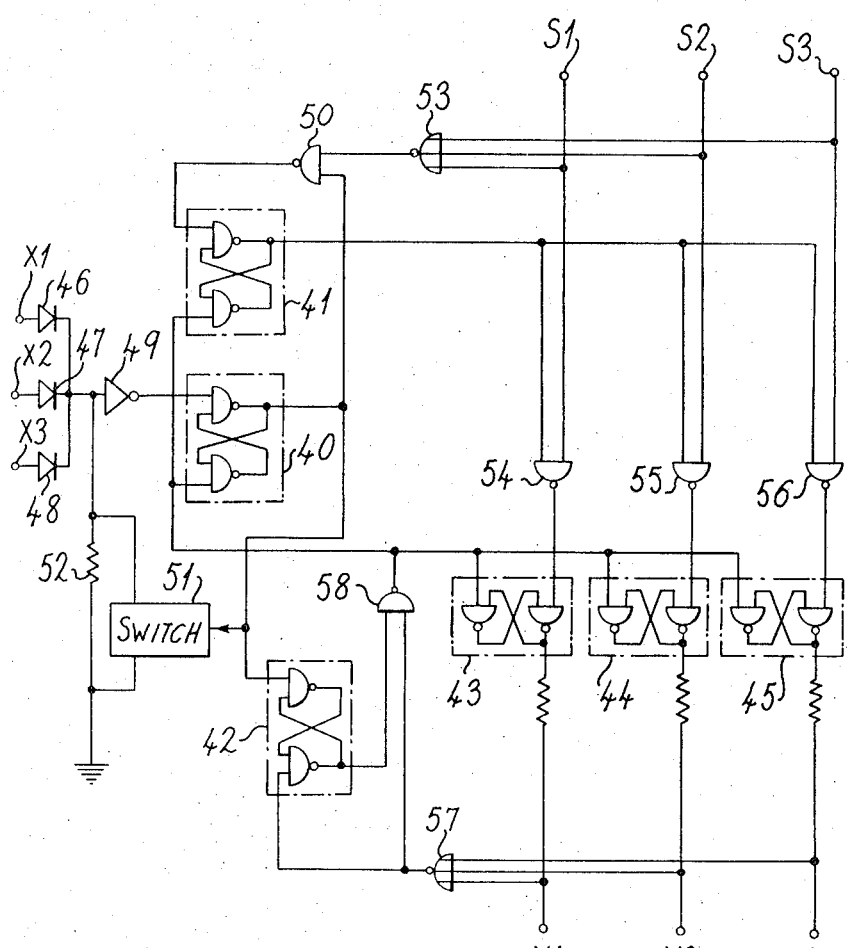
FIG. 4 is a schematic diagram of a nodal element in accordance with another embodiment of the invention.

It will be observed that each link of the state diagram of FIG. 1 is represented by two leads in FIG. 3, one for transmitting a forward going set signal and the other for transmitting a signal for resetting of the previous node. An economy of wiring can be achieved by using nodal elements of a type in which a single lead can be used for those purposes. Such a nodal element will hereinafter be referred to as a single wire nodal element. A single wire nodal element is illustrated in FIG. 4. In FIG. 4, the same reference letters as were used in FIG. 2 will be used to denote each class of terminal, X terminates also fulfilling the function of P terminals and Y terminals also fulfilling the function of R terminals. In each case, only three outputs and stimulus inputs are shown but it will be realised that a greater number can readily be provided.

The nodal element shown in FIG. 4, which operates with positive logic connections between nodes, comprises three bistable devices 40, 41, and 42 each of which comprises a pair of cross-connected NAND gates. Three further bistables 43, 44 and 45, also consisting of pairs of cross-connected NAND gates, are connected in the path between the stimulus input terminals S1, S2 and S3 and the corresponding output terminals Y1, Y2 and Y3.

Initially the input terminals X1, X2 and X3, the stimulus input terminals S1, S2 and S3 and the output terminals Y1, Y2 and Y3 are all at logical 0. The bistables 40, 41, 42, 43, 44 and 45 are all reset. The input terminals X1, X2 and X3 are connected via respective diodes 46, 47 and 48 and an inverter 49 to the set input of the bistable 40 so that when any of these inputs go to logical 1, the bistable 40 is set. The set output of the bistable 40 is connected to one input of a NAND gate 50, to the reset input of the bistable 42, for a purpose which will be explained hereinafter, and to the control input of a switch 51 which is preferably a transistor switch. The switch 51 is in parallel with a resistance 52 which connects the input of the inverter 49 to earth. Consequently, on setting of the bistable 40, the switch 51 shorts the input terminals X1, X2 and X3 to ground.

As will be explained hereinafter, this is operative to reset the nodal element which initiated the signal causing the setting of bistable 40.

The other input of the NAND gate 50 is connected to the output of a NOR gate 53 which has a respective input connected to each of the stimulus input terminals S1, S2 and S3. Thus, provided that all three stimulus inputs S1, S2 and S3 are at logic 0, the gate 50 operates but if any of the stimulus inputs is at logic 1, for example because a previous stimulus is still in existence, the NAND gate 50 is inhibited until such previous stimulus ceases. On operation of the NAND gate 50, the bistable 41 is set.

Setting of the bistable 41 applies logical 1 to one of the input terminals of each of three NAND gates 54, 55 and 56, which connect the stimulus input terminals S1, S2 and S3 to the set inputs of bistables 43, 44 and 45. Thus on receipt of a stimulus at any of the stimulus input terminals S1, S2 and S3, the corresponding bistable 43, 44 or 45 is set, applying logical 1 to the corresponding output terminal Y1, Y2 or Y3. Since the output terminals Y1, Y2 and Y3 are connected, via a NOR gate 57 to its set input, the bistable 42 becomes set, putting logical 1 on one of the inputs of a NAND gate 58, the output of which is connected to reset all the bistables except bistable 42.

As soon as the bistable 40 of a subsequent nodal device becomes set following application of logical 1 to one of the output terminals Y1, Y2 and Y3 in the nodal device under consideration, the switch 51 in the subsequent nodal element closes, shorting the inputs thereof to ground. This pulls down the operative one of the output terminals Y1, Y2 and Y3 of the initiating node to logical 0 thus allowing the output of the NOR gate 57 to go to logical 1. The output of NAND gate 58 thus goes to logical 0, resetting all the bistables except for the bistable 42. Resetting of the bistable 40 causes logical 0 to be applied to its set output thus resetting the bistable 42. The nodal device is now in its initial condition except that one of the stimulus inputs S1, S2 and S3 may still be a logical 1. As already explained, even if the node is almost immediately set again, the NAND gate 50 prevents such a continuing stimulus from causing a malfunction.

If required, an output (not shown) indicating the state of the node, can be connected to the set output of the bistable 40.

In some special circumstances where some stimuli are not connected to every node, it may be desired to enable the nodal element to respond to a stimulus which is present before it is set. This can be arranged by connecting the stimulus input terminal concerned to the output of an AND gate having one input connected to receive the stimulus and the other connected to the set output of the bistable 40. This ensures that, even if the stimulus is present before the bistable 40 is set, it is not presented to the appropriate stimulus input terminal S1, S2 or S3 until after setting of the bistable 40 has taken place. When the nodal element is to be fabricated as an integrated circuit, it is preferable to provide an output terminal connected to the set output of the bistable 40 to enable this additional AND gate to be connected externally if required. Such an additional output terminal can be used for any other purpose where an indication of the state of the node is required.

The nodal device illustrated in FIG. 4 may be used in the machine shown in FIG. 3. In both cases the connections to X, Y and S terminals are as shown in FIG. 3 and the connections between P and R terminals are omitted.

We claim:

1. A logic element comprising a control device having first and second stable states adapted to be set into its first stable state in response to an input signal at a first input thereof, gating means operative in response to the control device to connect a plurality of stimulus input terminals of the element to respective output terminals thereof when the control device is in its first stable state, resetting means for producing a resetting signal consequent upon said control device taking up its first stable state and inhibiting means operative to prevent a stimulus signal which caused production of a signal at said first input from reaching said respective output terminal.

2. A logic element as claimed in claim 1, in which said inhibiting means is operative to inhibit said gating means until the signal at the set input of the control device ceases.

3. A logic element as claimed in claim 2, comprising first and second bistables each having set and reset inputs and set and reset outputs the set output of the first bistable being connected to the set input of the second bistable via said inhibiting means which is operative to inhibit setting of the second bistable until the signal at the set input of the first bistable has ceased.

4. A logic element as claimed in claim 1, in which the resetting means is operative to apply a resetting signal to said first input of the control device, the element also comprising reset response means for applying a signal to a second input of the control device to set it into its second state responsive to receipt of a resetting signal at an output terminal thereof.

5. A logic element as claimed in claim 4, in which said inhibiting means is operative to inhibit said gating means until receipt of a stimulus signal subsequent to the control device taking up its first stable state.

6. A logic element as claimed in claim 4, in which the level of the resetting signal differs from that of the input signal and the reset response means comprises a reset response bistable having its set input connected to the output of said gating means and reset gating means having one input connected to the set output of the reset response bistable and another input so connected that the reset gating means is inhibited by a signal at the set input of the reset response bistable whereby, on occurrence of a resetting signal subsequent to an output signal, said reset gating means applies a signal to the second input of the control device.

7. A sequential machine comprising a plurality of logic elements, as claimed in claim 1, interconnected to perform functions represented by corresponding nodes of a stable graph indicative of the response of the machine to a predetermined stimulus signal sequence.

8. A sequential machine comprising a plurality of logic elements, each of said logic elements comprising a control device having first and second stable states adapted to be set into its first stable state in response to an input signal at a first input thereof, gating means operative in response to the control device to connect a plurality of stimulus input terminals of said element to respective output terminals thereof when the control device is in its first stable state and resetting means for producing a resetting signal at a reset output of said element consequent upon said control device taking up its first stable state, and logic elements being interconnected with at least one of the output terminals of at least one logic element connected to the first input of another logic element and the reset output of said other logic element connected to set the control device of said one logic element into its second stable state, each logic element including inhibiting means operative to prevent a stimulus signal which causes the production of said setting input signal from reaching said respective output terminal.

9. A sequential machine as claimed in claim 8, in which said inhibiting means is operative to inhibit said gating means until the signal at the set input of said control device ceases.

10. A sequential machine as claimed in claim 8, in which the resetting means of each nodal element is operative to apply a resetting signal to said first input of the control device thereof, each element also comprising reset response means for applying a signal to a second input of the control device to set it into its second state responsive to receipt of a resetting signal at one of said output terminals thereof.

11. A sequential machine as claimed in claim 10, in which the inhibiting means of each nodal element is operative to inhibit said gating means until receipt of a stimulus signal subsequent to the control device of said nodal element taking up its first stable state.

* * * * *